(12) United States Patent
Liu et al.

(10) Patent No.: US 10,571,618 B2
(45) Date of Patent: Feb. 25, 2020

(54) DISPLAY BACKLIGHT WITH AN OPTICAL FILM

(71) Applicant: Apple Inc., Cupertino, CA (US)

(72) Inventors: Rong Liu, Sunnyvale, CA (US); Yu P. Sun, San Jose, CA (US); Jun Qi, Cupertino, CA (US); Victor H. Yin, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 520 days.

(21) Appl. No.: 14/943,202

(22) Filed: Nov. 17, 2015

(65) Prior Publication Data

US 2017/0052301 A1 Feb. 23, 2017

Related U.S. Application Data

(60) Provisional application No. 62/206,605, filed on Aug. 18, 2015.

(51) Int. Cl.
*G02F 1/1335* (2006.01)
*F21V 8/00* (2006.01)

(52) U.S. Cl.
CPC ........... *G02B 6/005* (2013.01); *G02B 6/0051* (2013.01); *G02F 1/133615* (2013.01); *G02F 2001/133607* (2013.01)

(58) Field of Classification Search
CPC ............................................... G02F 1/133528
See application file for complete search history.

(56) References Cited

U.S. PATENT DOCUMENTS

| | | | |
|---|---|---|---|
| 6,166,787 A * | 12/2000 | Akins | G02B 1/11 348/337 |
| 7,074,463 B2 * | 7/2006 | Jones | G02B 5/0226 252/299.01 |
| 7,633,679 B2 | 12/2009 | Mi | |
| 7,766,531 B2 | 8/2010 | Anderson et al. | |
| 8,721,153 B2 | 5/2014 | Kinder et al. | |
| 2010/0253885 A1 * | 10/2010 | Jones | G02B 5/045 349/96 |
| 2011/0149554 A1 * | 6/2011 | Ouderkirk | G02B 6/0053 362/97.1 |

(Continued)

FOREIGN PATENT DOCUMENTS

CN 101460876 6/2009

*Primary Examiner* — Edmond C Lau
(74) *Attorney, Agent, or Firm* — Treyz Law Group, P.C.; Joseph F. Guihan

(57) ABSTRACT

A backlight unit may include a turning film that receives light from a light guide layer. The turning film may have a plurality of elongated protrusions that extend across the turning film. Each protrusion may have a concave surface. The concave surface may be a curved surface that curves inward towards the interior of the turning film. Light from the light guide layer may pass through the turning film and be reflected towards a viewer by the concave surfaces of the protrusions. In a liquid crystal display, the turning film may be interposed between the light guide layer and a lower polarizer. In certain embodiments, the turning film may be the only optical layer interposed between the light guide layer and the lower polarizer. In other embodiments, the turning layer and a diffuser layer may be the only optical layers interposed between the light guide layer and the lower polarizer.

8 Claims, 14 Drawing Sheets

(56) References Cited

U.S. PATENT DOCUMENTS

| | | | | |
|---|---|---|---|---|
| 2012/0002437 A1* | 1/2012 | Yabe | ............... | G02B 6/0028 |
| | | | | 362/606 |
| 2013/0148377 A1* | 6/2013 | Mi | ............... | G02B 6/0036 |
| | | | | 362/606 |
| 2014/0093650 A1* | 4/2014 | Greener | ............... | B29D 11/00326 |
| | | | | 427/510 |
| 2015/0253487 A1 | 9/2015 | Nichol et al. | | |

* cited by examiner

DISPLAY BACKLIGHT WITH AN OPTICAL FILM

This application claims the benefit of provisional patent application No. 62/206,605 filed on Aug. 18, 2015, which is hereby incorporated by reference herein in its entirety.

BACKGROUND

This relates generally to electronic devices with displays, and, more particularly, to displays with backlights.

Electronic devices such as computers and cellular telephones have displays. Some displays such as plasma displays and organic light-emitting diode displays have arrays of pixels that generate light. In displays of this type, backlighting is not necessary because the pixels themselves produce light. Other displays contain passive pixels that can alter the amount of light that is transmitted through the display to display information for a user. Passive pixels do not produce light themselves, so it is often desirable to provide backlight for a display with passive pixels.

In a typical backlight assembly for a display, a light guide plate is used to distribute backlight generated by a light source such as a light-emitting diode light source. Optical films may be placed on top of the light guide plate. A reflector may be formed under the light guide plate to improve backlight efficiency.

In conventional backlight assemblies, a large number of optical films are used to collimate and diffuse the light that is emitted from the light guide plate. For example, four or more films may be required to manipulate the backlight. This may result in the backlight assembly having a larger than desirable thickness.

It would therefore be desirable to be able to provide displays with improved backlights.

SUMMARY

A display may have an array of pixels for displaying images for a viewer. The array of pixels may be formed from display layers such as a color filter layer, a liquid crystal layer, a thin-film transistor layer, an upper polarizer layer, and a lower polarizer layer.

A backlight unit may be used to produce backlight illumination for the display. The backlight illumination may pass through the polarizers, the thin-film transistor layer, the liquid crystal layer, and the color filter layer. The backlight unit may have a row of light-emitting diodes that emit light into a light guide layer.

The backlight unit may include a turning film that receives light from the light guide layer. The turning film may have a plurality of protrusions. Each protrusion may be an elongated protrusion that extends across the entire turning film. Each protrusion may have a concave surface. The concave surface may be a curved surface that curves inward towards the interior of the turning film. Light from the light guide layer may pass through the turning film and be reflected towards the viewer of the display by the concave surfaces of the protrusions.

In a liquid crystal display, the turning film may be interposed between the light guide layer and the lower polarizer. In certain embodiments, the turning film may be the only optical layer interposed between the light guide layer and the lower polarizer. In other embodiments, a diffuser layer may be included. The turning layer and diffuser layer may be the only optical layers interposed between the light guide layer and the lower polarizer. In yet another embodiment, a brightness enhancement film may be interposed between the lower polarizer and the diffuser layer.

Further features of the invention, its nature and various advantages will be more apparent from the accompanying drawings and the following detailed description of the preferred embodiments.

DETAILED DESCRIPTION

Figure 1:
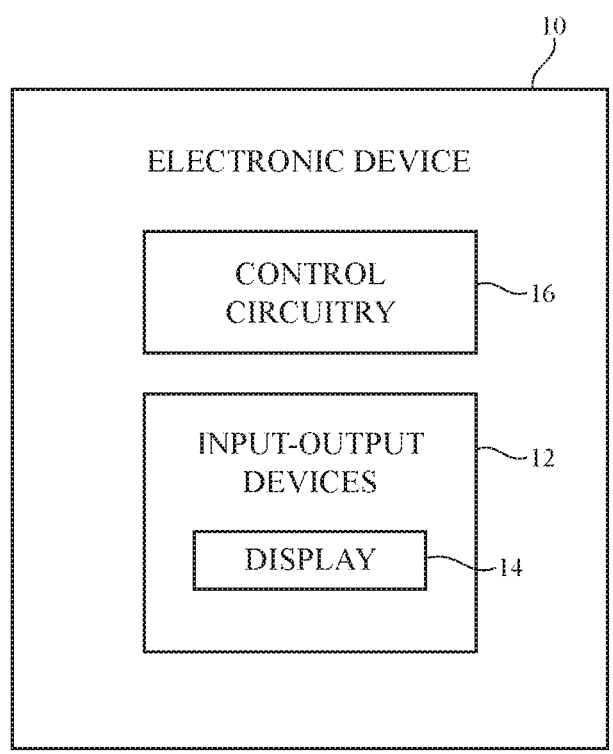
FIG. 1 is a schematic diagram of an illustrative electronic device having a display in accordance with an embodiment.

An illustrative electronic device of the type that may be provided with a display is shown in FIG. 1. As shown in FIG. 1, electronic device 10 may have control circuitry 16. Control circuitry 16 may include storage and processing circuitry for supporting the operation of device 10. The storage and processing circuitry may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in control circuitry 16 may be used to control the operation of device 10. The processing circuitry may be based on one or more microprocessors, microcontrollers, digital signal processors, baseband processors, power management units, audio chips, application specific integrated circuits, etc.

Input-output circuitry in device 10 such as input-output devices 12 may be used to allow data to be supplied to device 10 and to allow data to be provided from device 10 to external devices. Input-output devices 12 may include buttons, joysticks, scrolling wheels, touch pads, key pads, keyboards, microphones, speakers, tone generators, vibrators, cameras, sensors, light-emitting diodes and other status indicators, data ports, etc. A user can control the operation of device 10 by supplying commands through input-output devices 12 and may receive status information and other output from device 10 using the output resources of input-output devices 12.

Input-output devices 12 may include one or more displays such as display 14. Display 14 may be a touch screen display that includes a touch sensor for gathering touch input from a user or display 14 may be insensitive to touch. A touch sensor for display 14 may be based on an array of capacitive touch sensor electrodes, acoustic touch sensor structures, resistive touch components, force-based touch sensor structures, a light-based touch sensor, or other suitable touch sensor arrangements.

Control circuitry 16 may be used to run software on device 10 such as operating system code and applications. During operation of device 10, the software running on control circuitry 16 may display images on display 14.

Device 10 may be a tablet computer, laptop computer, a desktop computer, a television, a cellular telephone, a media player, a wristwatch device or other wearable electronic equipment, or other suitable electronic device.

Display 14 for device 10 includes an array of pixels. The array of pixels may be formed from liquid crystal display (LCD) components or other suitable display structures. Configurations based on liquid crystal display structures are sometimes described herein as an example.

A display cover layer may cover the surface of display 14 or a display layer such as a color filter layer, thin-film transistor layer, or other portion of a display may be used as the outermost (or nearly outermost) layer in display 14. The outermost display layer may be formed from a transparent glass sheet, a clear plastic layer, or other transparent member.

Figure 2:
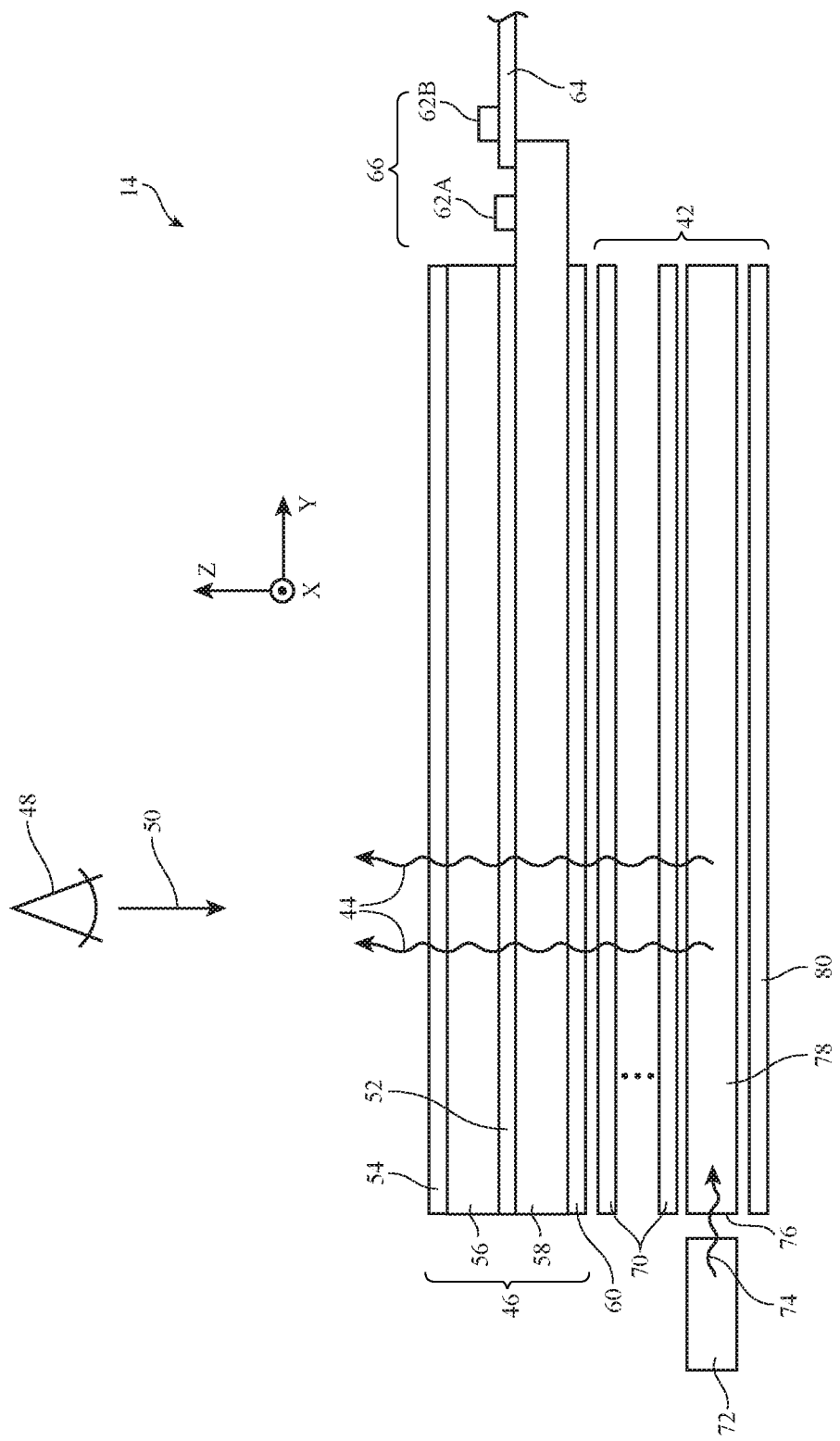
FIG. 2 is a cross-sectional side view of an illustrative display in an electronic device in accordance with an embodiment.

A cross-sectional side view of an illustrative configuration for display 14 of device 10 is shown in FIG. 2. As shown in FIG. 2, display 14 may include a backlight unit such as backlight unit 42 (sometimes referred to as a backlight or backlight structures) for producing backlight 44. During operation, backlight 44 travels outwards (vertically upwards in dimension Z in the orientation of FIG. 2) and passes through pixel structures in display layers 46. This illuminates any images that are being produced by the pixels for viewing by a user. For example, backlight 44 may illuminate images on display layers 46 that are being viewed by viewer 48 in direction 50.

Display layers 46 may be mounted in chassis structures such as a plastic chassis structure and/or a metal chassis structure to form a display module for mounting in a housing in device 10 or display layers 46 may be mounted directly in an electronic device housing for device 10 (e.g., by stacking display layers 46 into a recessed portion in a metal or plastic housing). Display layers 46 may form a liquid crystal display or may be used in forming displays of other types.

In a configuration in which display layers 46 are used in forming a liquid crystal display, display layers 46 may include a liquid crystal layer such a liquid crystal layer 52. Liquid crystal layer 52 may be sandwiched between display layers such as display layers 58 and 56. Layers 56 and 58 may be interposed between lower polarizer layer 60 and upper polarizer layer 54.

Layers 58 and 56 may be formed from transparent substrate layers such as clear layers of glass or plastic. Layers 56 and 58 may be layers such as a thin-film transistor layer and/or a color filter layer. Conductive traces, color filter elements, transistors, and other circuits and structures may be formed on the substrates of layers 58 and 56 (e.g., to form a thin-film transistor layer and/or a color filter layer). Touch sensor electrodes may also be incorporated into layers such as layers 58 and 56 and/or touch sensor electrodes may be formed on other substrates.

With one illustrative configuration, layer 58 may be a thin-film transistor layer that includes an array of pixel circuits based on thin-film transistors and associated electrodes (pixel electrodes) for applying electric fields to liquid crystal layer 52 and thereby displaying images on display 14. Layer 56 may be a color filter layer that includes an array of color filter elements for providing display 14 with the ability to display color images. If desired, layer 58 may be a color filter layer and layer 56 may be a thin-film transistor layer. Configurations in which color filter elements are combined with thin-film transistor structures on a common substrate layer may also be used.

During operation of display 14 in device 10, control circuitry (e.g., one or more integrated circuits on a printed circuit) may be used to generate information to be displayed on display 14 (e.g., display data). The information to be displayed may be conveyed to a display driver integrated circuit such as circuit 62A or 62B using a signal path such as a signal path formed from conductive metal traces in a rigid or flexible printed circuit such as printed circuit 64 (as an example). Integrated circuits such as integrated circuit 62A and/or flexible printed circuits such as flexible printed circuit 64 may be attached to substrate 58 in ledge region 66 (as an example).

Backlight structures 42 may include a light guide layer such as light guide layer 78. Light guide layer 78 may be formed from a transparent material such as clear glass or plastic. During operation of backlight structures 42, a light source such as light source 72 may generate light 74. Light source 72 may be, for example, an array of light-emitting diodes (e.g., a series of light-emitting diodes that are arranged in a row that extends into the page in the orientation of FIG. 2). The array of light-emitting didoes may be mounted to a rigid or flexible printed circuit. The printed circuit may be adhered to adjacent layers in the electronic device. In certain embodiments, the printed circuit may be adhered to portions of light guide layer 78.

Light 74 from light source 72 may be coupled into edge surface 76 of light guide layer 78 and may be distributed in dimensions X and Y throughout light guide layer 78 due to the principal of total internal reflection. Light guide layer 78 may include light-scattering features such as pits, bumps, grooves, or ridges that help light exit light guide layer 78 for use as backlight 44. These features may be located on an upper surface and/or on an opposing lower surface of light guide layer 78. With one illustrative configuration, a first surface such as the lower surface of light guide layer 78 has a pattern of bumps and an opposing second surface such as the upper surface of light guide layer 78 has a pattern of ridges (sometimes referred to as lenticules, lenticular structures, or lenticular ridges). Light source 72 may be located at the left of light guide layer 78 as shown in FIG. 2 or may be located along the right edge of layer 78 and/or other edges of layer 78.

Light 74 that scatters upwards in direction Z from light guide layer 78 may serve as backlight 44 for display 14. Light 74 that scatters downwards may be reflected back in the upward direction by reflector 80. Reflector 80 may be formed from a reflective structure such as a substrate layer of plastic coated with a dielectric mirror formed from alternating high-index-of-refraction and low-index-of-refraction inorganic or organic layers. Reflector 80 may be formed from a reflective material such as a layer of white plastic or other shiny materials.

To enhance backlight performance for backlight structures 42, backlight structures 42 may include optical films 70. Optical films 70 may include diffuser layers for helping to homogenize backlight 44 and thereby reduce hotspots. Optical films 70 may also include prism films (sometimes referred to as turning films) for collimating backlight 44. Optical films 70 may overlap the other structures in backlight unit 42 such as light guide layer 78 and reflector 80. For example, if light guide layer 78 has a rectangular footprint in the X-Y plane of FIG. 2, optical films 70 and reflector 80 may each have a matching rectangular footprint. Optical films 70 may include compensation films for enhancing off-axis viewing or compensation films may be formed within the polarizer layers of display 14 or elsewhere in display 14.

Figure 3:
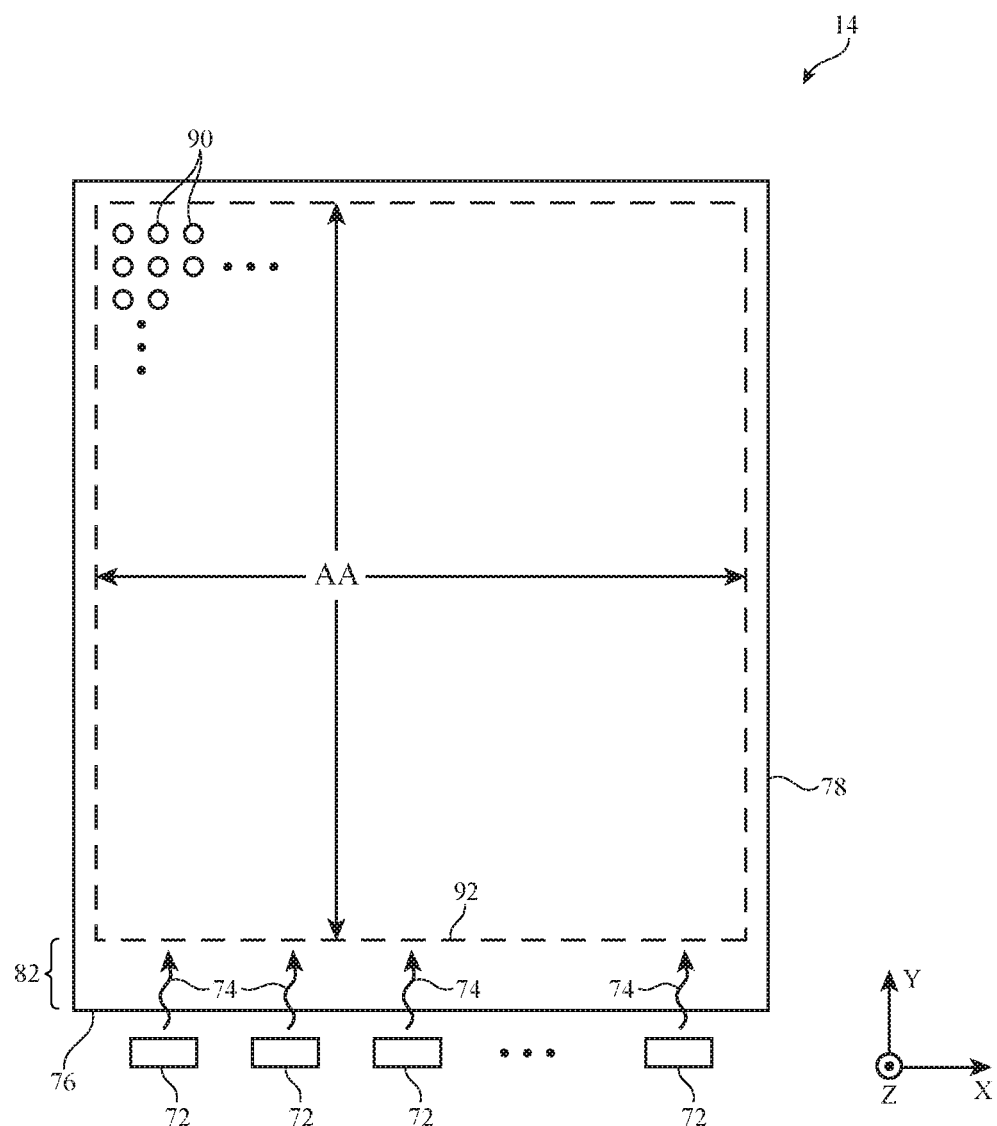
FIG. 3 is a top view of an illustrative display in accordance with an embodiment.

FIG. 3 is a top view of a portion of display 14 showing how display 14 may have an array of pixels 90 formed within display layers 46. Pixels 90 may have color filter elements of different colors such as red color filter elements R, green color filter elements G, and blue color filter elements B. Pixels 90 may be arranged in rows and columns and may form active area AA of display 14. The borders of active area AA may be slightly inboard of the borders of light-guide layer 78 to ensure that there are no visible hotspots in display 14 (i.e., no areas in which the backlight illumination for display 14 is noticeably brighter than surrounding areas). For example, border 92 of active area AA may be offset by a distance 82 from lower edge 76 of light guide layer 78. It is generally desirable to minimize the size of distance 82 so that display 14 is as compact as possible for a given active area size. Nevertheless, distance 82 should not be too small to ensure that there is adequate light mixing. In particular, distance 82 should be sufficiently large to allow light 74 that is emitted from light-emitting diodes 72 to homogenize enough to serve as backlight illumination. Distance 82 is often as long as necessary to ensure light from light-emitting diodes 72 is sufficiently mixed. Accordingly, distance 82 may sometimes be referred to as mixing distance 82. When light 74 is initially emitted from individual light-emitting diodes 72, light 74 is concentrated at the exits of light-emitting diodes 72 and is absent in the spaces between light-emitting diodes 72. After light 74 has propagated sufficiently far within light-guide plate 78 (i.e., after light 74 has traversed a sufficiently large mixing distance 82), light 74 will be smoothly distributed along dimension X and will no longer be concentrated near the exits of respective individual light-emitting diodes 72.

Figure 4:
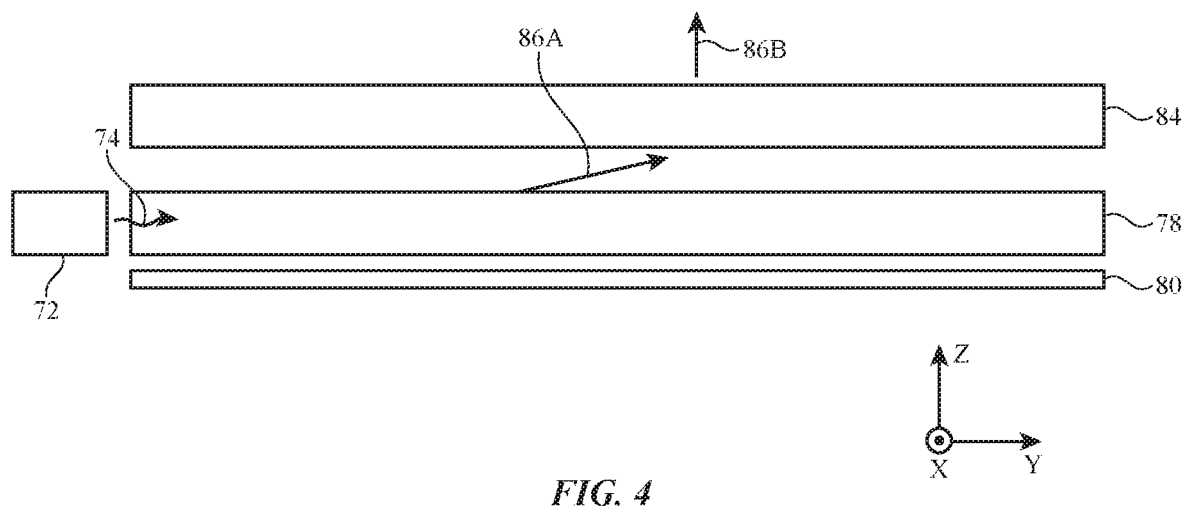
FIG. 4 is a cross-sectional side view of an illustrative display backlight unit with a turning film in accordance with an embodiment.

FIG. 4 is a cross-sectional side view of an illustrative display backlight unit with a turning film. As shown in FIG. 4, light emitting diodes 72 may emit light 74 that travels in the Y-direction along the length of light guide layer 78. The light guide layer and reflector 80 may combine to emit light 86A out of the light guide layer. Light 86A may exit light guide layer 78 at a "shallow" angle. This means that light 86A is travelling primarily in the Y-direction as opposed to the Z-direction. Turning film 84, which may sometimes be referred to as a prism film or an optical layer, may collimate light 86A. Shallow light 86A may enter turning film 84 and exit turning film 84 as steeply angled light 86B. Light 86B may have a "steep" angle, meaning that light 86B travels primarily in the Z-direction as opposed to the Y-direction. Turning film 84 may use reflection and/or refraction to direct light in the Z-direction towards the viewer of the display. In certain embodiments, turning film 84 may be the only optical film 70 included in the display backlight. In other embodiments, turning film 84 may be used in combination with one, two, three, four, or more than four additional optical films 70.

Figure 5:
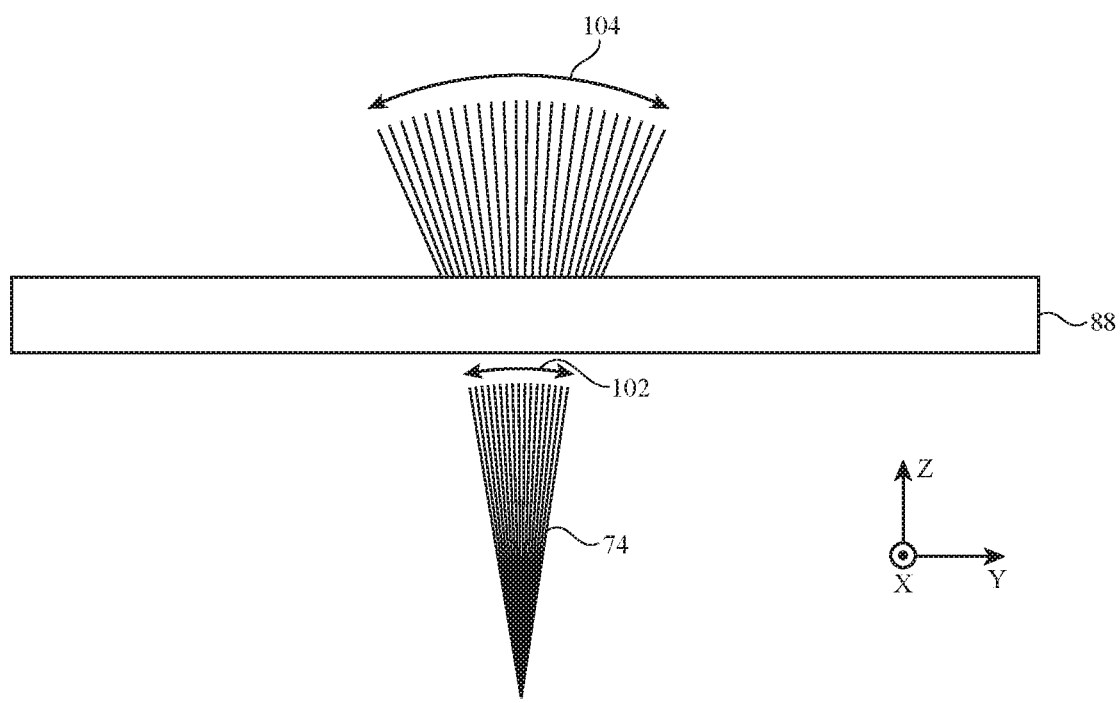
FIG. 5 is a cross-sectional side view of an illustrative diffuser layer for a display backlight unit in accordance with an embodiment.

Optical layers 70 in display 14 may include a diffuser layer such as diffuser layer 88. Diffuser layer 88 may help homogenize light 74 and thereby reduce hotspots. FIG. 5 shows a cross-sectional side view of an illustrative diffuser layer for a display backlight unit. As shown, light 74 may approach diffuser layer 88 in a cone. The cone of light 74 may enter diffuser layer having an angle 102. The initial angle may be less than 10°, less than 20°, less than 30°, more than 30°, etc. The diffuser layer 88 may homogenize the incoming light and widen the angle of the cone of light. As shown in FIG. 5, light 74 may exit the diffuser layer in a cone with an angle 104. Angle 104 may be greater than angle 102. In one illustrative example, light 74 may approach diffuser layer 88 with an angle 102 of 15°. The light may exit with an angle 104 of 30° after being homogenized by diffuser layer 88. The wider angle of the cone of light may improve the performance of display 14.

Figure 6:
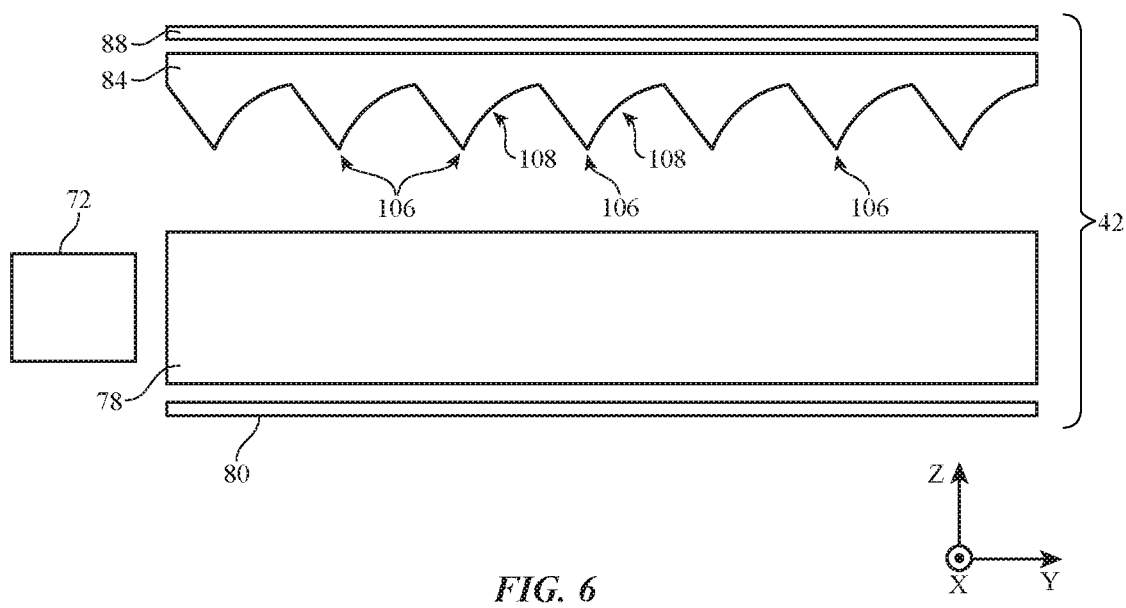
FIG. 6 is a cross-sectional side view of an illustrative backlight unit with a turning film that has protrusions with concave surfaces and a diffuser layer in accordance with an embodiment.

FIG. 6 shows a cross-sectional side view of an illustrative backlight unit with a turning film and a diffuser layer. As shown in FIG. 6, turning film 84 may be positioned above light guide layer 78. Diffuser layer 88 may be positioned above turning film 84. Turning film 84 may have a number of protrusions 106. The protrusions may be elongated protrusions that extend along the entire width of turning film 84 in the X-direction. The protrusions may be configured to collimate and spread light that is received from light guide layer 78. Each protrusion 106 may include a concave surface 108.

In certain embodiments, turning film 84 and diffuser 88 may be the only optical films 70 in backlight unit 42. In other embodiments, additional optical films such as a brightness enhancement film may be provided. There may be no additional optical layers interposed between the turning film and the light guide layer. There may be no additional optical layers interposed between the diffuser layer and the lower polarizer. Turning film 84 and diffuser layer 88 may be the only optical layers interposed between the light guide layer and the lower polarizer of display 14. In other embodiments, diffuser layer 88 may be formed as an integral portion of turning film 84. Diffuser layer 88 may be embedded in turning film 84. In these embodiments, a single optical layer 84 may both turn and diffuse light from light guide layer 78. In embodiments where only turning film 84 is included in display backlight 42, no additional optical layers may be included in the backlight. There may be no additional optical layers interposed between the turning film and the lower polarizer. There may be no additional optical layers interposed between the turning film and the light guide layer.

Figure 7:
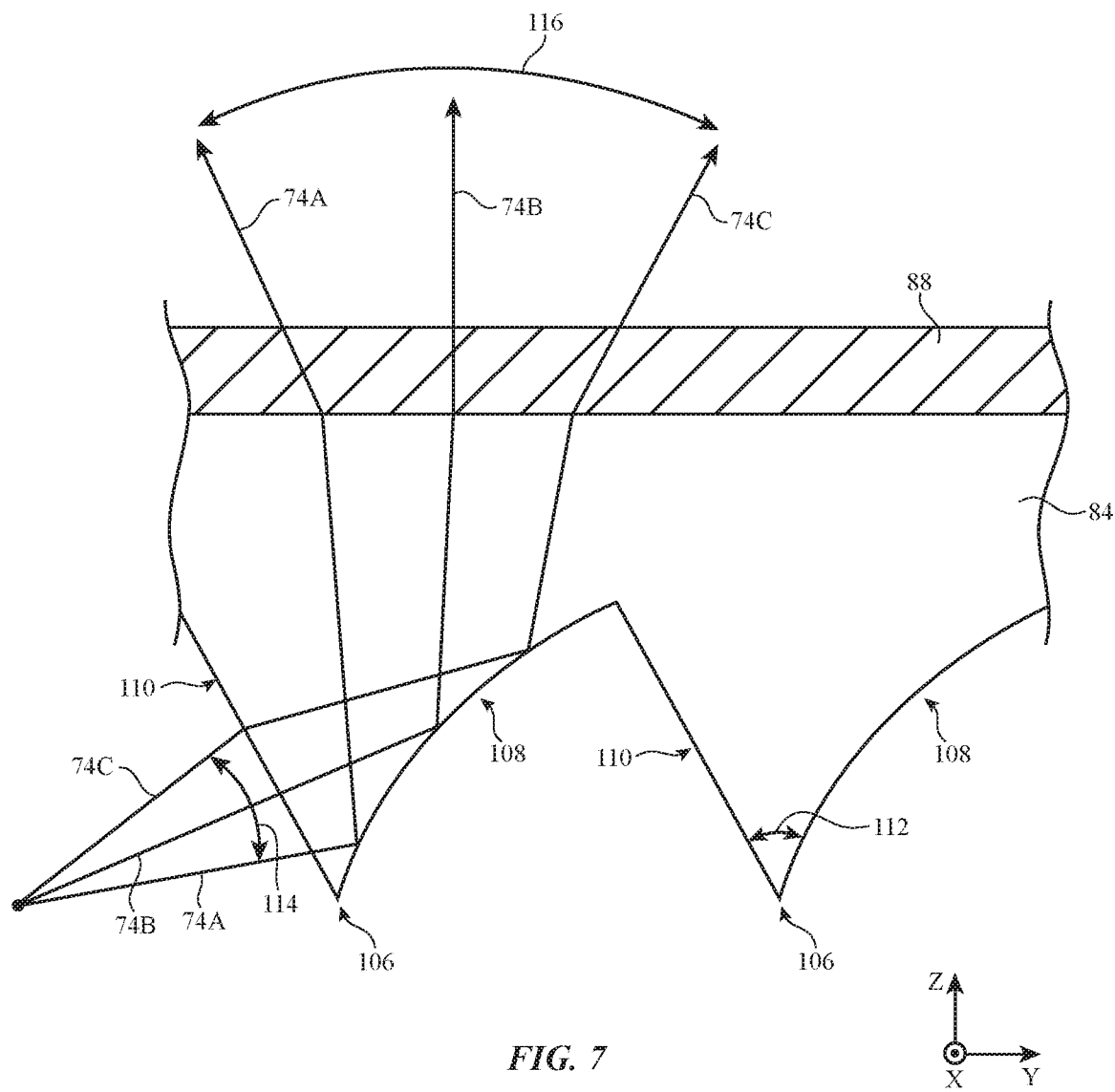
FIG. 7 is a cross-sectional side view of an illustrative turning film that has protrusions with concave surfaces in accordance with an embodiment.

FIG. 7 is a cross-sectional side view of an illustrative turning film with protrusions having concave surfaces. As shown in FIG. 7, protrusions 106 may include a concave surface 108 that is positioned at an angle with respect to surface 110. Concave surface 108 and surface 110 may be separated by an angle 112 (between 40° and 50°, between 30° and 60°, between 20° and 70°, less than 70°, more than 20°, etc.). Angle 112 may be selected based on the specific design needs for the particular display. As shown, light may enter the turning film through surface 110. Light rays 74A, 74B, and 74C may enter turning film 84 from a variety of angles. In general, light may enter turning film 84 primarily through surface 110 (as opposed to concave surface 108). Surface 110 may face light-emitting diodes 72, which means that most light will exit light guide layer 78 and strike surface 110 of the protrusions of the turning film.

Protrusions 106 of turning film 84 may be configured to spread light along the Y-direction. Light rays 74A, 74B, and 74C may enter turning film 84 in a cone with an angle 114. The light rays may be refracted when passing through surface 110 and entering turning film 84. After passing through surface 110, the light rays may be reflected off of concave surface 108. The shape of concave surface 108 enables the light rays to be reflected in the Z-direction. This way, the incoming light (which travels primarily in the Y-direction) can be turned to travel in the Z-direction towards the viewer of the display. Additional refraction may occur when the light passes through diffuser layer 88. The light may exit the optical films 70 in a cone with an angle 116. Angle 116 may be greater than angle 114. The shape of protrusions 106 may be designed to control the paths of light 74 as light passes through the turning film. For example, if desired the concave surface may be altered to produce light with a narrower or larger angle 116. Concave surface 108 may be a curved surface that curves inward towards the interior of the turning film. Concave surface 108 may asymptotically approach a plane that is parallel to the top surface of turning film 84.

Light rays such as light rays 74A, 74B, and 74C may be reflected off of concave surface 108 due to total internal reflection. Additionally, concave surface 108 may be provided with a reflective material if desired. White plastic or other shiny materials may be used to ensure concave surface 108 is a reflective surface.

FIG. 7 depicts diffuser layer 88 as being positioned above turning film 84. As discussed previously, diffuser layer 88 may be a layer formed separately from the turning film. In these embodiments, diffuser layer 88 may be formed directly on top of and in direct contact with turning film 84 or diffuser layer 88 may be separated from the top surface of turning film 84 by a gap. Alternatively, diffuser layer 88 may be a portion of turning film 84 that is formed integrally with turning film 84.

In FIGS. 6 and 7, protrusions 106 of turning film 84 are depicted as uniform shape and separation across the turning film. However, this example is merely illustrated. If desired, the shape of each protrusion may be uniform (e.g., FIG. 6). Alternatively, at least some of the protrusions may have a varying shape. For example, the shape of each protrusion may vary along the Y-axis. The cross-section of each protrusion may also vary. For example, a first portion of a protrusion may have a first cross-section and a second portion of a protrusion may have a second cross-section that is different than the first cross-section. In FIG. 6, protrusions 106 are depicted as being spaced uniformly (e.g., the distance between each protrusion is the same across the entire turning film). This example is purely illustrative. If desired, the distance between each protrusion may vary in a regular or irregular pattern.

Figure 8:
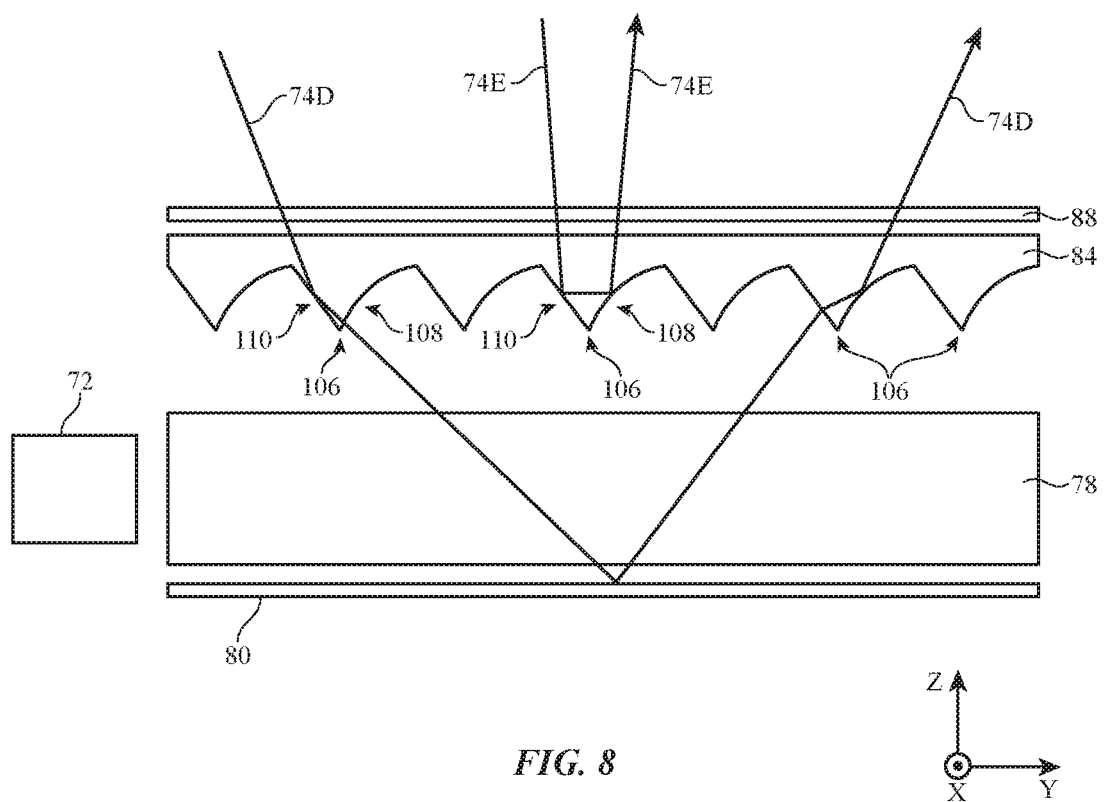
FIG. 8 is a cross-sectional side view of an illustrative display backlight with a turning film that reflects ambient light in accordance with an embodiment.

FIG. 8 is a cross-sectional side view of an illustrative display backlight with a turning film that reflects ambient light. The protrusions of turning film 84 may enable ambient light to be recycled and emitted from the display as backlight. This enhances the efficiency of the display, particularly in situations with high ambient light levels (e.g., high sunlight exposure). Ambient light that reaches turning film 84 may first pass through display layers 46 including upper polarizer 54 and lower polarizer 60. Therefore, ambient light that reaches turning film 84 may be linearly polarized. Turning film 84 may be formed from a material that is not birefringent to ensure the polarization of light is not changed as light passes through the turning film. Turning film 84 may have low or zero birefringence, which may increase the efficiency of the display.

As shown, both shallow and steep ambient light rays such as 74D and 74E may be reflected and emitted as backlight by turning film 84. Light ray 74D may approach turning film 84 at an angle. The light ray may be reflected off of surface 110 of protrusion and approach concave surface 108 of protrusion 106. Because light ray 74D approaches concave surface 108 from a substantially perpendicular angle, light ray 74D may pass through concave surface 108. Light ray 74D may then pass through light guide layer 78 and be reflected by reflector 80. Light ray 74D may exit light guide layer 78 and act with the same characteristics as light emitted from the light-emitting diodes that exits the light guide layer (e.g., light rays 74A, 74B, and 74C in FIG. 7).

Light ray 74E may approach turning film 84 at a relatively steep angle. Light ray 74E may be reflected off of both surface 110 and concave surface 108. The light ray 74E may then exit the turning film and act as backlight for the display.

The depicted paths of light rays 74D and 74E are merely illustrative, and ambient light may follow any number of paths when passing through turning film 84. In general, the structure of turning film 84 results in ambient light being recycled and used as backlight for the display. The ambient light may be reflected by the turning film and immediately be recycled as backlight or pass through the turning film and be introduced to the light guide layer where the light will then act as backlight. In either scenario, the ambient light is being used to light the display and the efficiency of the display is increased.

Figure 9:
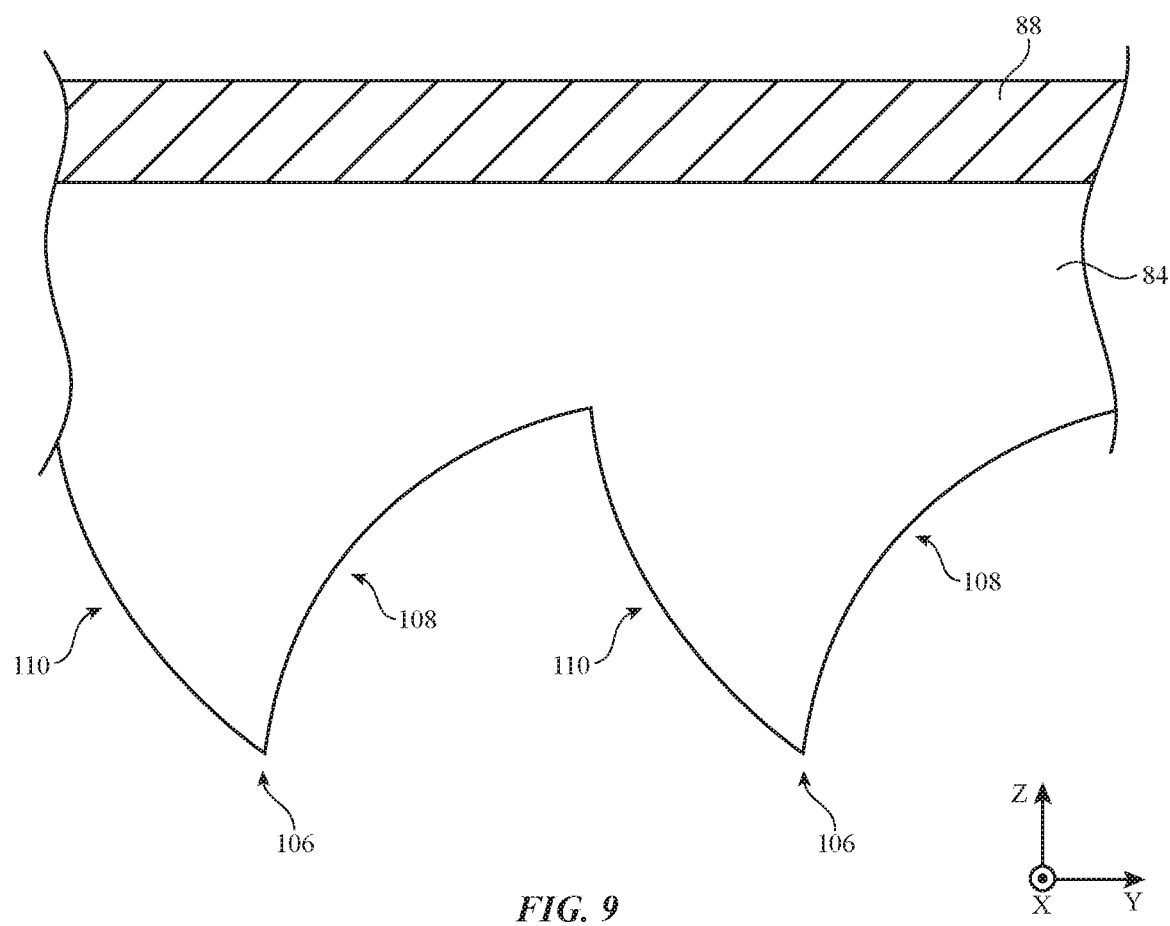
FIG. 9 is a cross-sectional side view of an illustrative turning film with a protrusion having a concave surface and a convex surface in accordance with an embodiment.

In FIGS. 6-8, surface 110 of each protrusion 106 is depicted as being a planar surface. However, surface 110 may have any desired shape. In particular, surface 110 may be a convex surface. FIG. 9 is a cross-sectional side view of an illustrative turning film with a protrusion having a concave surface and a convex surface. Convex surface 110 may be a curved surface that curves outward towards the exterior of the turning film. When surface 110 has a convex shape, incident light from the light guide layer may be more narrowly focused after being refracted by convex surface 110. This may result in increased control of how the light travels through turning film 84.

Figure 10A:
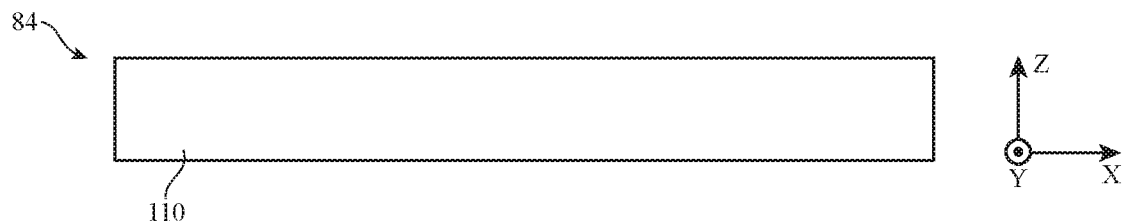
FIG. 10A is a cross-sectional side view of an illustrative turning film with no surface features for spreading light along the X-axis in accordance with an embodiment.

Surface 110 and concave surface 108 of protrusions 106 primarily spread light in the Y-direction. However, it may be desirable to spread light in the X-direction as well. FIG. 10A is a cross-sectional side view of an illustrative turning film with no surface features for spreading light along the X-axis. Surface 110 may merely be a planar or convex surface with no additional microlenses, prisms, or other spreading features.

Figure 10B:
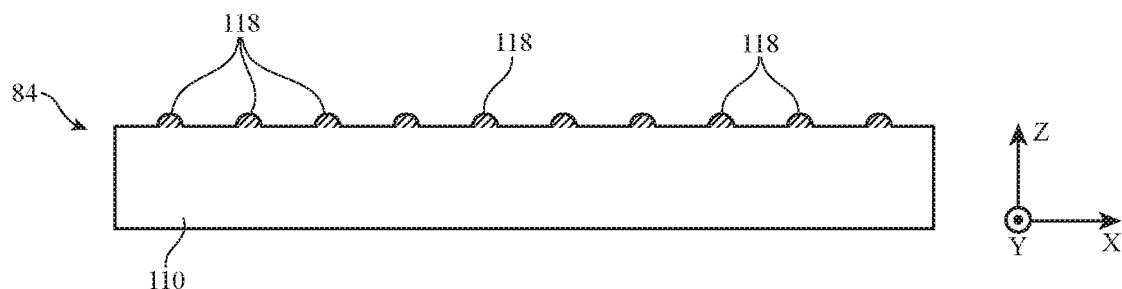
FIG. 10B is a cross-sectional side view of an illustrative turning film with spreading features on the top surface of the turning film in accordance with an embodiment.

FIG. 10B is a cross-sectional side view of an illustrative turning film with spreading features on the top surface of the turning film. As shown, spreading features 118 may be positioned on the top surface of the turning film. The spreading features may be prisms or microlenses that spread light in the X-direction. The spreading features may be elongated ridges (sometimes referred to as lenticular features) that extend along the length of the turning film in the Y-direction. The ridges may have a curved surface or may be triangular. The ridges may run parallel to the dimension Y (i.e., the direction in which the exit faces of light-emitting diodes 72 are oriented and the direction in which light 74 is emitted into edge 76 of light guide layer 78). Spreading features 118 may all be symmetrical with respect to the Z-axis. In other embodiments, some or all of spreading features 118 may not be symmetrical with respect to the Z-axis. In FIG. 10B, spreading features 118 are shown as spaced evenly across the top surface of turning film 84. This example is merely illustrative. If desired, spreading features 118 may be unevenly spaced, or there may be no gaps between each spreading feature.

Figure 10C:
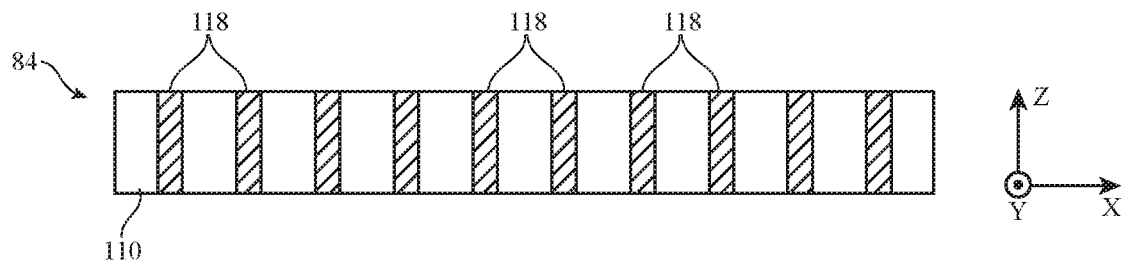
FIG. 10C is a cross-sectional side view of an illustrative turning film with spreading features on surfaces of protrusions in accordance with an embodiment.

FIG. 10C is a cross-sectional side view of an illustrative turning film with spreading features on surface 110 of protrusions 106. As shown, each protrusion 106 may be provided with spreading features 118 on surface 110. The spreading features may be prisms, microlenses, or elongated ridges. The spreading features may be positioned on surface 110 of each protrusion 106. In one illustrative embodiment, the spreading features may be elongated ridges that run parallel to the respective surface 110 of each protrusion. As incident light passes through surface 110 of the protrusions, spreading features 118 may spread the light along the X-axis. Similar to the spreading features discussed in connection with FIG. 10B, spreading features 118 in FIG. 10C may be evenly spaced or may be unevenly spaced. In certain embodiments, there may be no gaps between each spreading feature. Spreading features 118 may be positioned at any desired angle with respect to the Z-axis. In FIG. 10C, spreading features 118 are shown as being positioned in the YZ plane. However, this example is merely illustrative and spreading features 118 may be positioned at an angle with respect to the YZ plane.

The spreading features of FIGS. 10B and 10C may be formed integrally with turning film 84. For example, the turning film may be shaped to have an integral surface that will spread light in the X-direction. Alternatively or in combination, spreading features 118 may be formed separately from turning film 84 and positioned adjacent to turning film 84.

Figure 11:
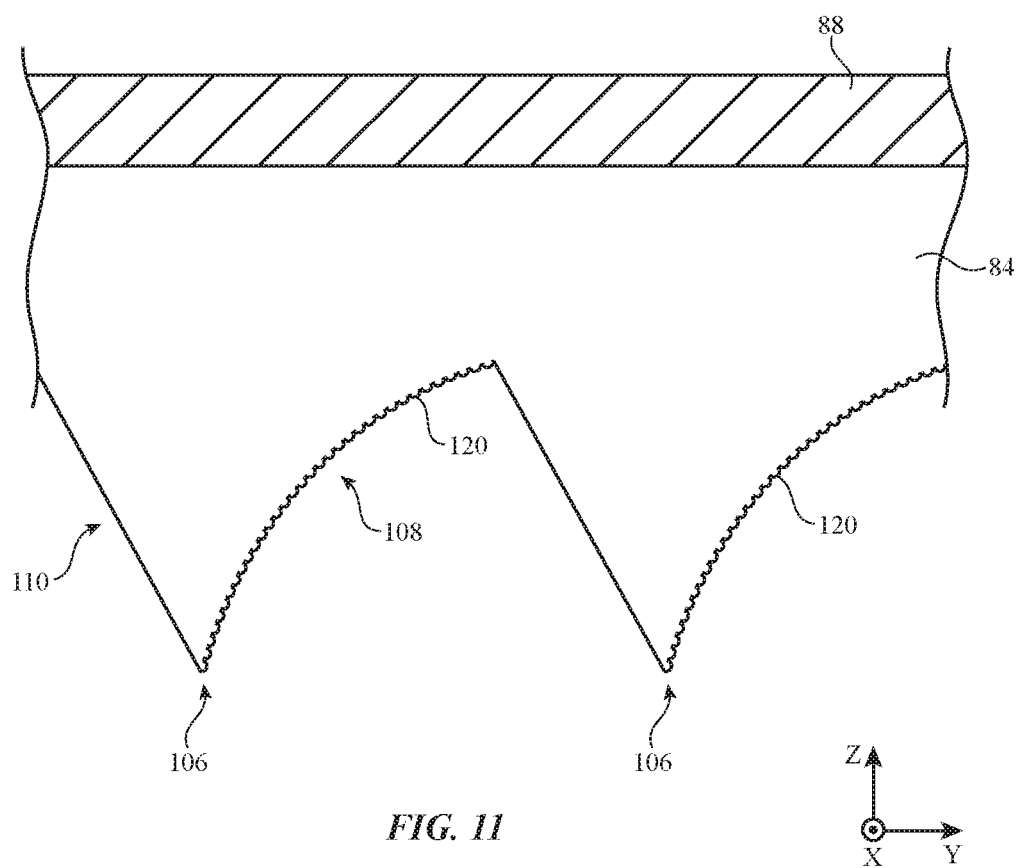
FIG. 11 is a cross-sectional side view of an illustrative turning film for a display backlight unit in accordance with an embodiment.

FIG. 11 is a cross-sectional side view of an illustrative turning film for a display backlight unit. As shown, the concave surface 108 of each protrusion 106 in turning film 84 may include structures 120 on the surface. Structures 120 may help reduce artifacts from being displayed by display 14. Structures 120 may be any combination of protrusions, recesses, planar portions, etc.

Figure 12:
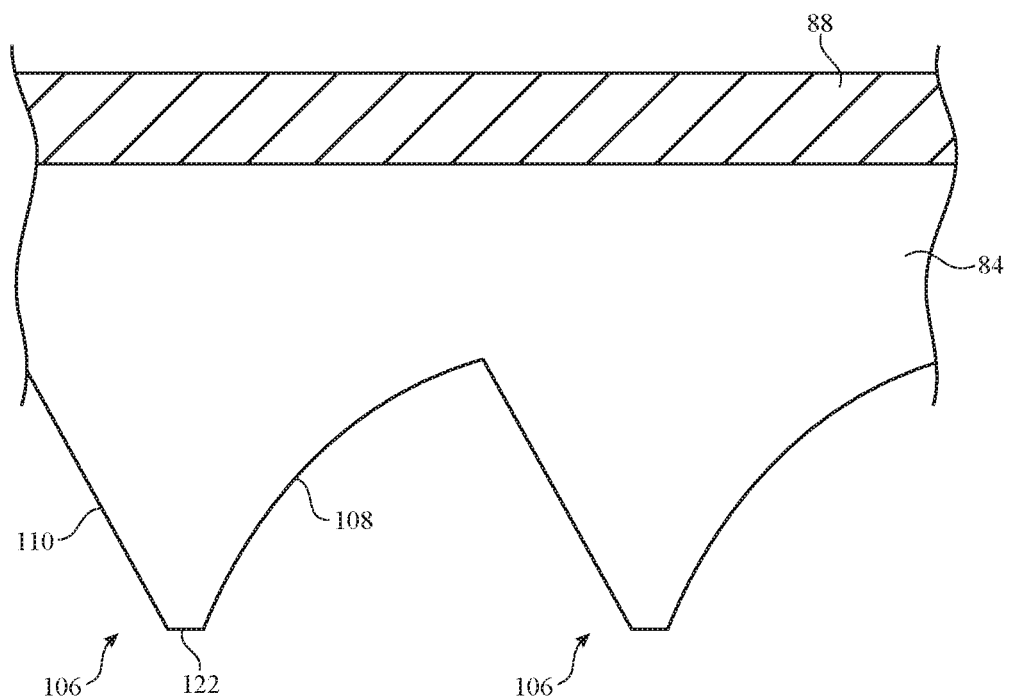
FIG. 12 is a cross-sectional side view of an illustrative turning film for a display backlight unit that has protrusions without sharply formed vertices in accordance with an embodiment.

FIG. 12 is a cross-sectional side view of an illustrative turning film for a display backlight unit. In some embodiments, protrusions 106 may have a vertex where surface 110 meets concave surface 108. This vertex may be a sharply formed vertex (e.g., FIGS. 6-9 and 11). However, this example is merely illustrative. If desired, protrusions 106 may instead have an additional surface 122 that connects surface 110 to concave surface 108. Surface 122 may be planar. Surface 122 may be parallel to the top surface of turning film 84. Surface 122 may also be curved. For example, surface 122 may be a concave surface or a convex surface.

Turning film 84 may be formed by cutting a roll of film with a diamond tool. For example, a diamond bit may be used to cut a roll of stock film to form turning film 84. Portions of turning film 84 may also be formed with a secondary manufacturing process. However, these examples are merely illustrative and turning film 84 may be formed with any desired method. Forming protrusions 106 with a sharp vertex (e.g., FIGS. 6-9 and 11) may be more difficult than forming protrusions 106 with a surface 122 in between surfaces 108 and 110 (e.g., FIG. 12). Therefore, the protrusions 106 may be formed with surface 122 for ease of manufacturing.

Figure 13:
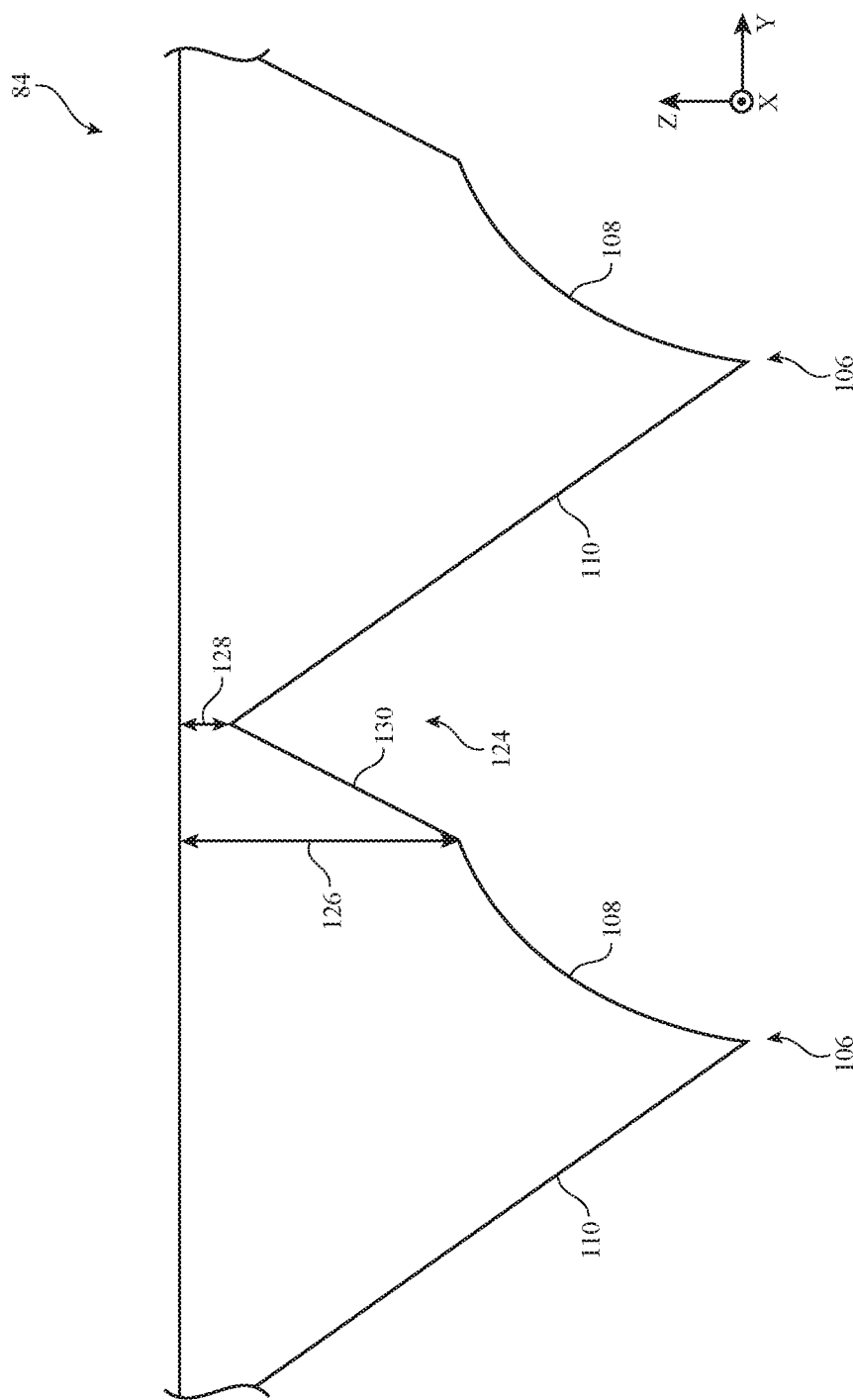
FIG. 13 is a cross-sectional side view of an illustrative turning film with recesses in between protrusions in accordance with an embodiment.
Figure 14:
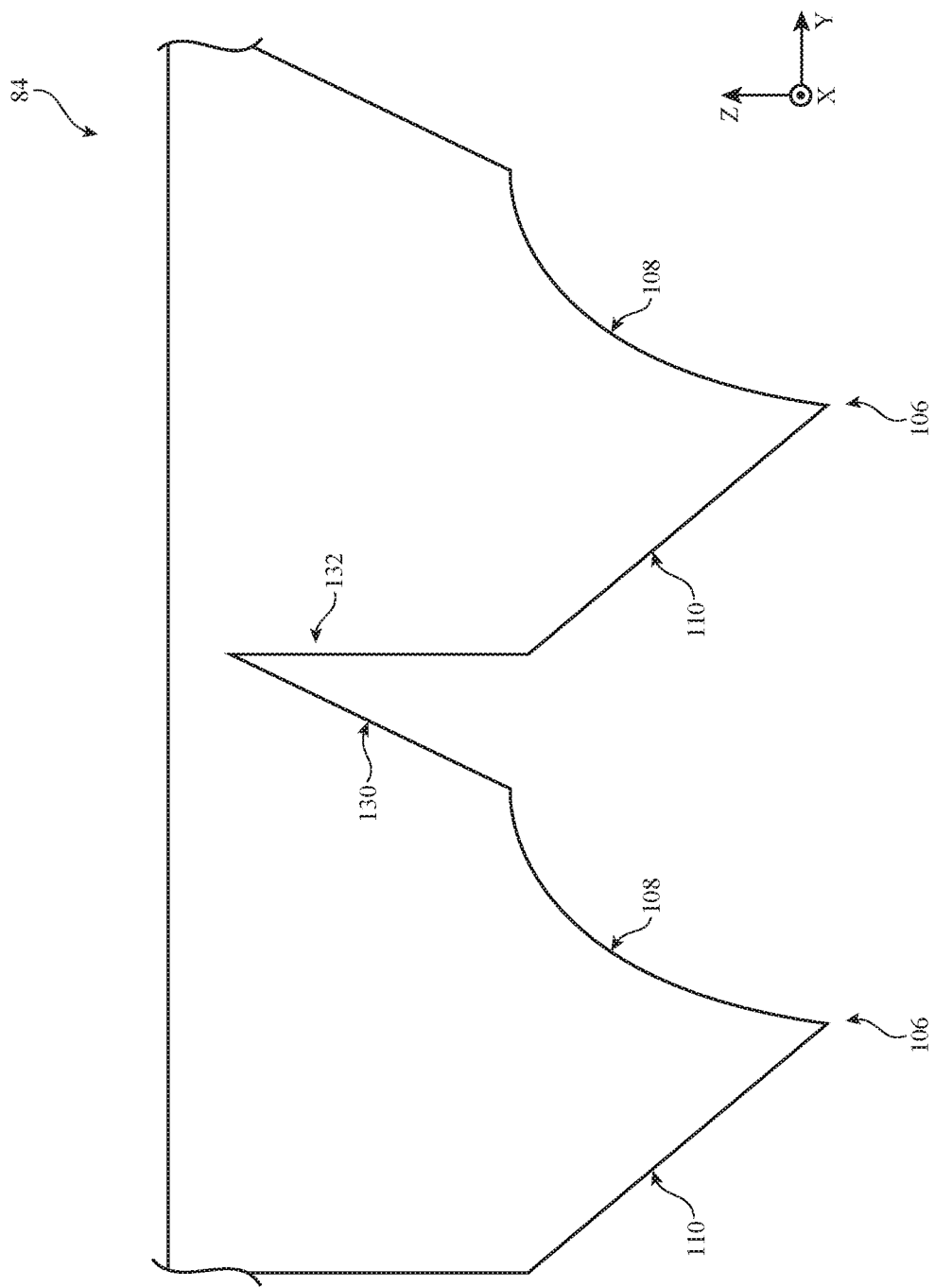
FIG. 14 is a cross-sectional side view of an illustrative turning film with recesses in between protrusions in accordance with an embodiment.

FIGS. 13 and 14 are cross-sectional side views of an illustrative turning film with recesses 124 in between protrusions 106. As shown in previous embodiments, concave surface 108 may be separated from the top surface of turning film 84 by distance 126. In certain embodiments, surface 110 may meet concave surface 108 directly such that distance 126 is the minimum thickness of turning film 84. In other embodiments (e.g., FIG. 13), turning film 84 may be provided with recessed portions 124. The recessed portions 124 may result in an additional surface 130 that meets concave surface 108. Additionally, the recessed portions ensure that the minimum thickness of turning film 84 is distance 128. Distance 128 may be smaller than distance 126. Providing turning film 84 with recessed portions 124 and surface 130 may ensure that light reflects off of surface 108 or 130 after passing through surface 110. In previous embodiments, some light may pass through surface 110 and travel above concave surface 108 through the gap between concave surface 108 and the top surface of the turning film. Recessed portions 124 in FIG. 13 minimize the size of that gap and ensure that as much light as possible is reflected off of concave surface 108 or surface 130 towards the viewer of the display.

In FIG. 13, surface 110 is shown as meeting surface 130. A continuous surface connects surface 130 to concave surface 108. This example is purely illustrative. If desired, an additional surface 132 may be used to connect surface 130 to surface 110, as shown in FIG. 14. This may enable protrusions 106 to be spaced closer together than in the embodiment of FIG. 13. In general, recessed portions 124 may have any desired shape and may be defined by any number of surfaces.

The foregoing is merely illustrative and various modifications can be made by those skilled in the art without departing from the scope and spirit of the described embodiments. The foregoing embodiments may be implemented individually or in any combination.

What is claimed is:
1. A display comprising:
   a plurality of light-emitting diodes;
   an upper polarizer;
   a lower polarizer;
   first and second transparent substrates interposed between the upper and lower polarizers;
   a liquid crystal layer between the first and second transparent substrates;
   a turning film that comprises a plurality of protrusions, wherein each protrusion of the plurality of protrusions comprises a concave surface and a surface that is positioned at an angle with respect to the concave surface; and a light guide layer configured to pass backlight from the plurality of light-emitting diodes through the turning film, the lower and upper polarizers, the first and second substrates, and the liquid crystal layer, wherein the turning film has a top surface, wherein the turning film is interposed between the liquid crystal layer and the light guide layer, wherein each protrusion of the plurality of the protrusions extends away from the top surface of the turning film towards the light guide layer, wherein the turning film further comprises a plurality of recesses, wherein a recess of the plurality of recesses is interposed between each adjacent pair of protrusions in the plurality of protrusions, wherein each recess defines a respective second surface that meets the concave surface of a respective protrusion, wherein the second surface is planar, and wherein the second surface of each protrusion is interposed between the concave surface of that protrusion and the surface of a respective adjacent protrusion.

2. The display defined in claim 1, wherein the turning film is the only optical layer interposed between the light guide layer and the lower polarizer.

3. The display defined in claim 1, further comprising a diffuser layer interposed between the turning film and the lower polarizer, wherein the turning film and the diffuser layer are the only optical layers interposed between the light guide layer and the lower polarizer.

4. The display defined in claim 1, wherein the turning film is configured to reflect ambient light through the lower and upper polarizers, the first and second substrates, and the liquid crystal layer.

5. The display defined in claim 4, wherein the turning film is formed from a material that is not birefringent.

6. The display defined in claim 1, further comprising a diffuser layer embedded in the turning film.

7. A turning film for a display backlight, the turning film comprising:
    a top surface;
    first and second opposing edges connected by the top surface; and
    a plurality of elongated protrusions that extend along the turning film from the first edge to the second edge, wherein each elongated protrusion comprises a first planar surface and a curved surface separated by an angle, and wherein the curved surface of each elongated protrusion curves inward towards an interior of the turning film; and
    a plurality of recesses, wherein a recess of the plurality of recesses is interposed between each adjacent pair of elongated protrusions in the plurality of elongated protrusions, wherein each recess defines a respective second planar surface that meets the curved surface of a respective elongated protrusion, and wherein the second planar surface of each elongated protrusion is interposed between the curved surface of that elongated protrusion and the first planar surface of a respective adjacent elongated protrusion.

8. The turning film defined in claim 7, wherein the angle is between 30° and 60°.

* * * * *